(12) United States Patent
Yan et al.

(10) Patent No.: US 8,971,294 B2
(45) Date of Patent: Mar. 3, 2015

(54) METHOD, APPARATUS AND SYSTEM FOR REPORTING MDT LOG RESULT

(75) Inventors: Nan Yan, Beijing (CN); Haitao Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 237 days.

(21) Appl. No.: 13/638,418

(22) PCT Filed: Apr. 2, 2011

(86) PCT No.: PCT/CN2011/072430
§ 371 (c)(1),
(2), (4) Date: Sep. 28, 2012

(87) PCT Pub. No.: WO2011/134340
PCT Pub. Date: Nov. 3, 2011

(65) Prior Publication Data
US 2013/0016702 A1    Jan. 17, 2013

(30) Foreign Application Priority Data

Apr. 30, 2010  (CN) .......................... 2010 1 0164441

(51) Int. Cl.
*H04W 4/00* (2009.01)
*H04W 36/00* (2009.01)

(52) U.S. Cl.
USPC ............ 370/331; 370/329; 455/439; 455/442

(58) Field of Classification Search
CPC ..... H04W 80/04; H04W 88/06; H04W 28/04; H04W 72/04; H04W 36/18; H04W 36/30; H04W 16/12; H04W 16/02
USPC ........... 370/328, 329, 331; 455/436, 439, 442
See application file for complete search history.

(56) References Cited

FOREIGN PATENT DOCUMENTS

CN        102098722 A      6/2011

OTHER PUBLICATIONS

CATT: "Handling of the Log Available Indication"; 3GPP TSG RAN WG2 Meeting #70, Montreal, Canada, May 10-14, 2010.
Communication dated Jul. 30, 2013 for EP 11774331.0 received from the Examining Division at the European Patent Office.

(Continued)

*Primary Examiner* — Ronald Abelson
(74) *Attorney, Agent, or Firm* — Foley & Lardner LLP; James F. Ewing; Paul M. H. Pua

(57) ABSTRACT

A method, a device and a system for reporting a Minimization Drive Test (MDT) log result are disclosed by the present invention for ensuring that the MDT log result can be reported in time. The method includes: after a User Equipment (UE) is re-accessed to a target cell from a original cell, if the UE still stores locally an unreported MDT log result, a log available indication can be sent to the target cell by the UE itself or by an Evolved Node Base station (eNB) managing the original cell, and a managing device of the target cell is notified to request the unreported MDT log result from UE. Therefore, the MDT log result is continued reporting in the target cell, and the target cell obtains the log available indication of the UE in time, initiates an acquiring request for the MDT log result to the UE timely and obtains the reported MDT log result in time, thus the collection for the environment information of a network is completed and the environment information is obtained exactly.

7 Claims, 9 Drawing Sheets

(56) References Cited

OTHER PUBLICATIONS

Email discussion rapporteur (Qualcomm Incorporated): "MDT considerations"; 3GPP TSG-RAN WG2 meeting #68bis, San Francisco, US, Feb. 22-26, 2010.

Nokia Siemens Networks, Nokia Corporation: "Logged MDT reporting when roaming"; 3GPP TSG-RAN WG2 Meeting #72, Jacksonville, US, Nov. 15-19, 2010.

Supplementary Search Report for EP Application No. 11774331.0 dated Jun. 18, 2013.

Vodafone, Telecom Italia: "Comparison of Logged MDT in Idle and Connected Mode"; 3GPP TSG RAN WG2 #69bis, Beijing, China, Apr. 12-16, 2010.

International Search Report for PCT/CN2011/072430 dated Jul. 14, 2011.

NTT DOCOMO: "offline discussion report on Inter-PLMN MDT reporting" 3GPP TSG-RAN2#72 R2-106935, Nov. 19, 2010 Jacksonville, USA, Nov. 15-19, 2010, retrieved from the internet: <URL: http://www.3GPP.org/ftp/TSG_RAN2_72/docs/R2-1 06935.zip> Section 2.

Alcatel-Lucent: "Idle Mode Logged MDT reporting mechanism" 3GPP TSG-RAN WG2 Meeting #69 bis R2-102056, Apr. 16, 2010 Beijing, China, Apr. 12-16, 2010, retrieved from the internet: <URL: http://www.3GPPorg/ftp/TSG_RAN_WG2_69bis/docs/R2-102056.zip> sections 1-2, fig.1.

Ericsson: "Triggers for Logged MDT measurement reporting" 3GPP TSG-RAN WG2#69 bis R2-101995, Apr. 16, 2010 Beijing, China, Apr. 12-16, 2010, retrieved from the internet: <URL:http://www.3GPPorg/ftp/TSG_RAN_WG2_69bis/docslR2-101995.zip>.

Samsung: "Procedure for Logged MDT in Idle" 3GPP TSG-RAN WG2#69 bis R2-102292, Apr. 16, 2010 Beijing, China, Apr. 12-16, 2010, retrieved from the internet: <URLhttp://www.3GPP.org/ftp/TSG_RAN_WG2_69bis/docs!R2-1 02292.zip>.

NTT DOCOMO: "MDT context handling during handover" 3GPP TSG-RAN2 #69 bis R2-102444, Apr. 16, 2010 Beijing, China, Apr. 12-16, 2010, retrieved from the internet: <URL:http://www.3GPPorg/ftp/TSG_RAN_WG2_69bis/docslR2-102444.zip>.

METHOD, APPARATUS AND SYSTEM FOR REPORTING MDT LOG RESULT

This application is a US National Stage of International Application No. PCT/CN2011/072430, filed 2 Apr. 2011, designating the United States, and claiming the benefit of Chinese Patent Application no. 201010164441.7, filed with the Chinese Patent Office on Apr. 30, 2010 and entitled "Method, apparatus and system for reporting MDT log result", which are hereby incorporated by reference in their entireties.

FIELD OF THE INVENTION

The present invention relates to the field of communications and particularly to a method, apparatus and system for reporting a Minimization Drive Test (MDT) log result.

BACKGROUND OF THE INVENTION

It is desirable in a future mobile communication system to alleviate human participation in planning, operating and maintaining a network by introducing a network self-optimization mechanism in which the network optimizes a parameter automatically according to a statistic to reduce the cost of building and operating the network. At present it is desirable to adopt an approach in which UEs could be configured by the network to report something for the purpose of alleviating the workload of a manual drive test. On the other hand, it is also desirable to obtain radio measurement information of an area inaccessible to a normal manual drive test. As ascertained in the R10 protocol of the Long Term Evolution (LTE) system, the architecture of applying the control plane is adopted for a Minimization Drive Test (MDT), and this architecture is advantageous in that an evolved base station (eNB, Evolved NodeB) can control a UE accurately. The architecture of applying the control plane has to adopt Radio Resource Control (RRC) signaling to bear parameters with which the UE is configured by the network and information reported from the UE to the network.

There are two categories of MDT measurement in the prior art:

Immediate MDT: The UE applies MDT measurement and reporting in a connected mode. Reuse the form of Radio Resource Management (RRM) measurement, a report is sent to the eNB or an RNC once a report condition is satisfied.

Logged MDT: The UE applies MDT measurement in an idle mode and subsequently reports it measurement result in a connected mode. The measurement result will be obtained and stored in the UE once a configured trigger condition is satisfied and will be reported to the eNB or an RNC in a subsequent appropriate occasion.

In the prior art, a log configuration of an MDT is transmitted from the network to the UE in a connected mode, using a new configuration method instead of extending the existing RRM measurement.

At the UE side: When the RRC connection is released, the UE will not release the received MDT log configuration but still store it and start the log measurement and collect a measurement result.

At the network side: The network will neither store the information on an MDT context for a logged MDT nor transport the MDT context between the network nodes. The MDT context stored at the network side will be released together with the RRC connection.

If the UE stores a log result for the logged MDT, the UE will report a log available indication, if any, to the network in an RRC Connection Setup Complete message if the UE enters a connected mode. Taking an LTE system as an example, FIG. 1 illustrates an RRC connection establishment process in which the UE will transmit an RRC Connection Setup Complete message to the network upon successful establishment of an RRC connection, where the message carries a bit which indicates whether the UE stores the available log, and the network received the indication can subsequently request the UE to report the MDT measurement log result.

However in the MDT measurement approach in the prior art, the UE with available log information can notify the network side in an RRC Connection Setup Complete message to trigger the network side to obtain the log information of the UE, but if a flow of re-access to another cell (e.g., a handover or connection reestablishment flow) takes place and the log information has not been reported or is reported incompletely at this time, then the target cell can not know whether the UE still has the log to report, thus possibly delaying of a normal report of the MDT log may be occurred.

SUMMARY OF THE INVENTION

The invention provides a method, apparatus and system for reporting an MDT log result so as to ensure a timely report of the MDT log result.

Specific technical solutions according to embodiments of the invention are as follows:

A method for reporting a Minimization Drive Test, MDT, log result, including:

determining that a User Equipment, UE, accesses a target cell from a source cell and that the UE stores an unreported MDT log result; and transmitting a message carrying a log availability indication to the target cell to instruct a serving equipment of the target cell to obtain the MDT log result from UE.

An apparatus for reporting a Minimization Drive Test, MDT, log result, including:

a first processing unit configured to determine that a User Equipment, UE, accesses a target cell from a source cell and that the UE stores an unreported MDT log result; and a second processing unit configured to transmit a message carrying a log availability indication to the target cell to instruct a serving equipment of the target cell to obtain the MDT log result from the UE.

A system for reporting a Minimization Drive Test, MDT, log result, including:

a User Equipment, UE, configured to determine that the UE accesses a target cell from a source cell and that the UE stores an unreported MDT log result and to transmit a message carrying a log availability indication to the target cell to instruct a serving equipment of the target cell to obtain the MDT log result from the UE; and a network-side equipment configured to serve the target cell of the UE and to provide the UE with a communication service.

In the embodiments of the invention, after a UE re-accesses a target cell from a source cell, if the UE still stores locally an unreported MDT log result, then the UE itself or an eNB serving the source cell can transmit a log availability indication to the target cell to instruct a serving equipment of the target cell to request the UE for obtaining the unreported MDT log result, thereby the MDT log result can continue to be reported in the target cell, so that the target cell obtains the log availability indication of the UE in time and thus initiates a request to the UE for obtaining the MDT log result on an appropriate occasion and obtains the MDT log result reported from the UE in time to collect network environment information and obtain the accurate environment information.

DETAILED DESCRIPTION OF THE EMBODIMENTS

Figure 1:
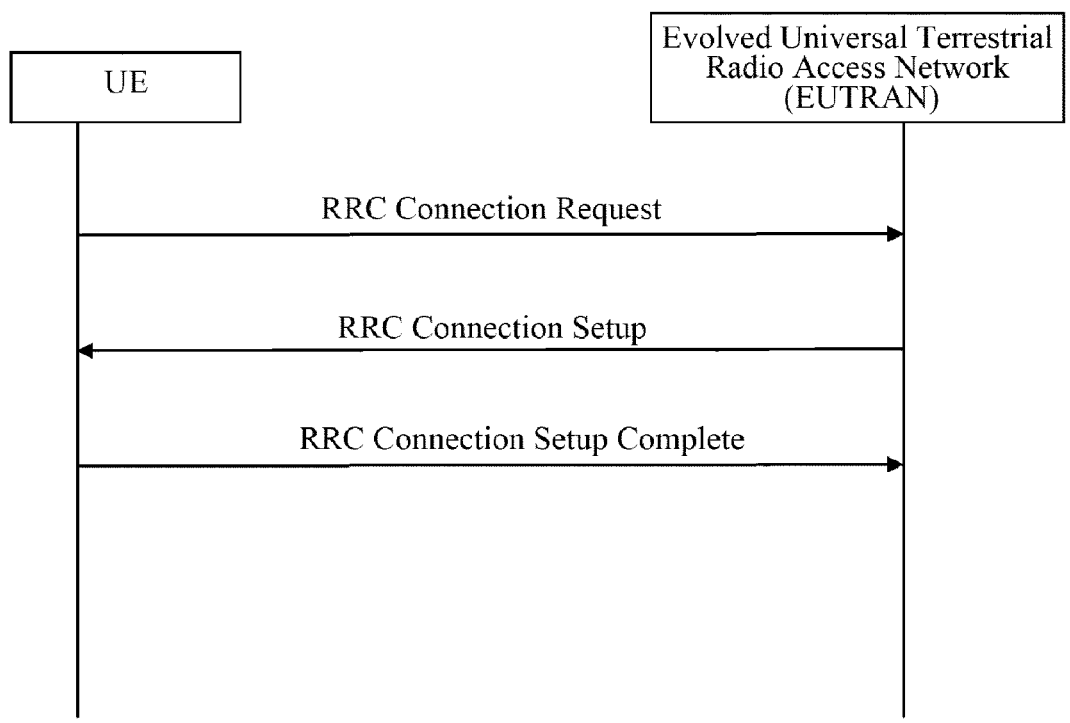
FIG. 1 and FIG. 2 are schematic diagrams of a UE reporting a log result in the form of a logged MDT in the prior art.
Figure 2:
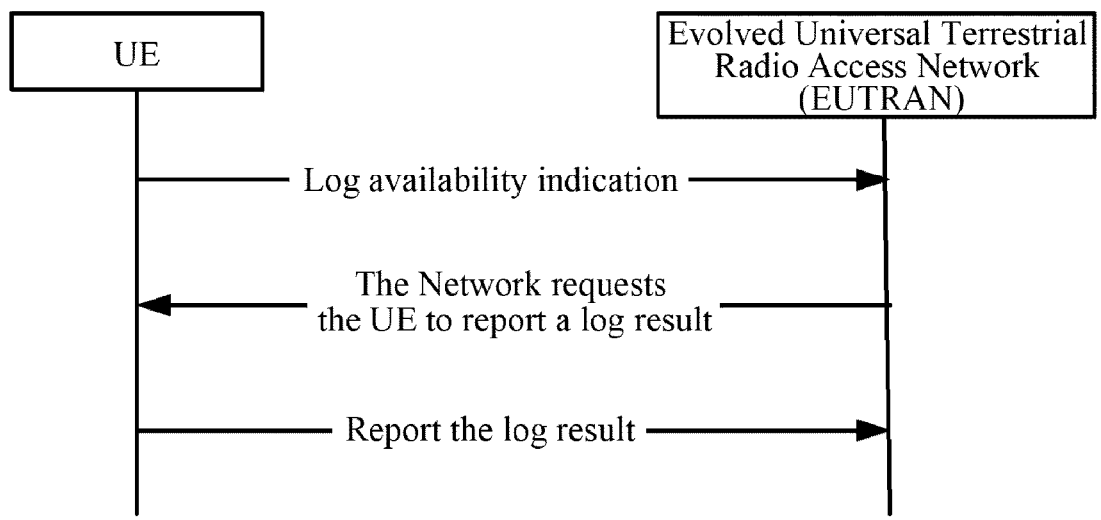

At present a logged MDT report can be made only if a UE enters a connected mode in a mobile communication system. Referring to FIG. 2, the UE will indicate in a connection establishment complete message to the network side whether a log is available after entering a connected mode from an idle mode, and the network side can request the UE to report an available log measurement result upon reception of the log availability indication. However if a re-access flow (e.g., handover or connection reestablishment) to another cell takes place while the UE is reporting the MDT log result or when the UE has not reported the MDT log result, then a target cell can not know whether the UE still stores the unreported MDT log result and thus can not request the UE to report the result. The UE can indicate the available log again to the network side only after entering an idle mode and establishing a new connection. As a result of this flow, the MDT log result which should have been reported in a connected mode remains in the memory of the UE and occupies the resource of the UE itself, and the network side can not obtain the MDT log result rapidly and consequently can not monitor a network environment in time, thus hindering accurate scheduling and allocation of a system resource.

In view of the foregoing problem, a description will be given taking a cell re-access including a handover or connection establishment as an example in embodiments of the invention. A UE also adds the same MDT log availability indication in an RRC Connection Reestablishment Complete and/or RRC Connection Reconfiguration Complete (Handover Complete) message besides the RRC Connection Setup Complete message, or transports the log availability indication directly to a target cell through the network side prior to a handover or reestablishment to notify a serving equipment of the target cell that the UE has available MDT log result which can subsequently be obtained in the target cell after the handover or reestablishment succeeds. The UE can release stored log contents after reporting the MDT log result completely to expand the size of an available vacant memory; and the network side can perform actions of improving network coverage, self-optimization, etc., with the obtained MDT log result.

Preferred embodiments of the invention will be described below in details with reference to the drawings.

Figure 3:
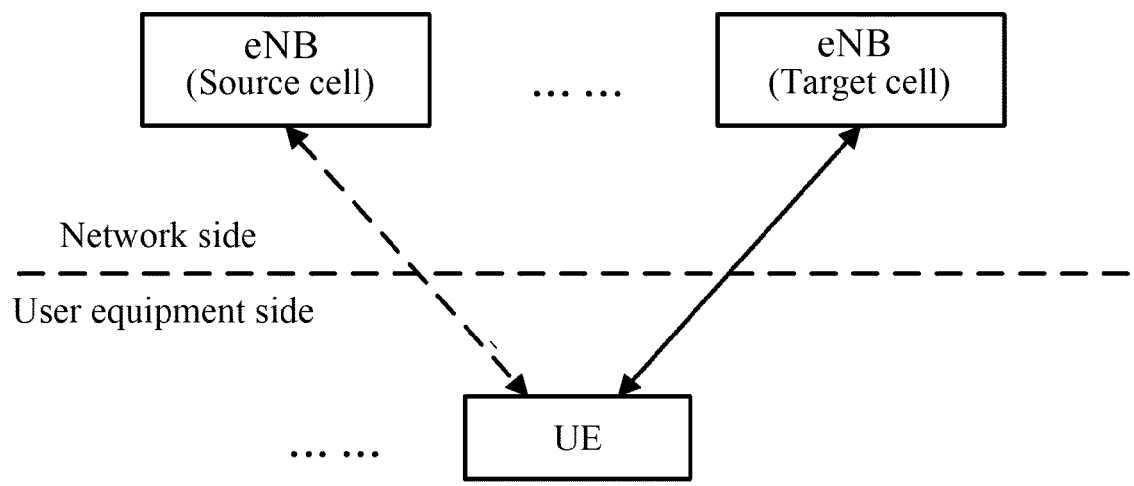
FIG. 3 is an architectural diagram of a mobile communication system in an embodiment of the invention.

In an embodiment of the invention, a system for reporting an MDT log result (e.g., an LTE system) includes a UE and a network-side equipment, and in the present embodiment, the network-side equipment is an evolved base station or an eNB as an example, although the network-side equipment can also be a home base station HeNB, a relay node, etc., in a practical application, as illustrated in FIG. 3.

In a first scenario:

The UE is configured to determine that the present UE accesses a target cell from a source cell and that the present UE stores an unreported MDT log result and to transmit a log availability indication to the target cell to instruct a serving equipment of the target cell to obtain the MDT log result from the present UE; and The eNB is configured to serve the target cell re-accessed by the UE, to provide the UE with a communication service and to obtain the corresponding MDT log result from the UE upon reception of the log availability indication transmitted from the UE.

In a second scenario:

The UE is configured to establish an signaling connection with a serving cell of the network side and to access a communication service provided by the network; and The eNB is configured to serve a source cell of the UE, to determine that the UE accesses a target cell from the source cell and that the UE stores an unreported MDT log result and to transmit a log availability indication to the target cell to instruct a serving equipment of the target cell to obtain the MDT log result from the UE.

In an embodiment of the invention, an apparatus for instructing an MDT log result to be obtained includes a first processing unit and a second processing unit, where:

The first processing unit is configured to determine that a UE accesses a target cell from a source cell and that the UE stores an unreported MDT log result; and The second processing unit is configured to transmit a log availability indication to the target cell to instruct a serving equipment of the target cell to obtain the MDT log result from the UE.

Figure 4:
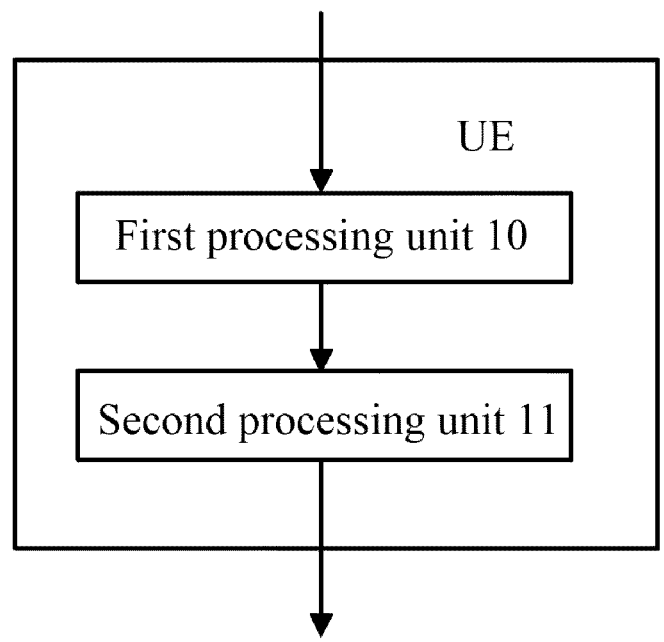
FIG. 4 is a functionally structural diagram of a UE in an embodiment of the invention.

Referring to FIG. 4, when the foregoing apparatus for instructing an MDT log result to be obtained is a UE, the UE includes a first processing unit 10 and a second processing unit 11, where:

The first processing unit 10 is configured to determine that the present UE accesses a target cell from a source cell and stores locally an unreported MDT log result; and The second processing unit 11 is configured to transmit a log availability indication to the target cell to instruct a serving equipment of the target cell to obtain the MDT log result from the present apparatus.

Figure 5:
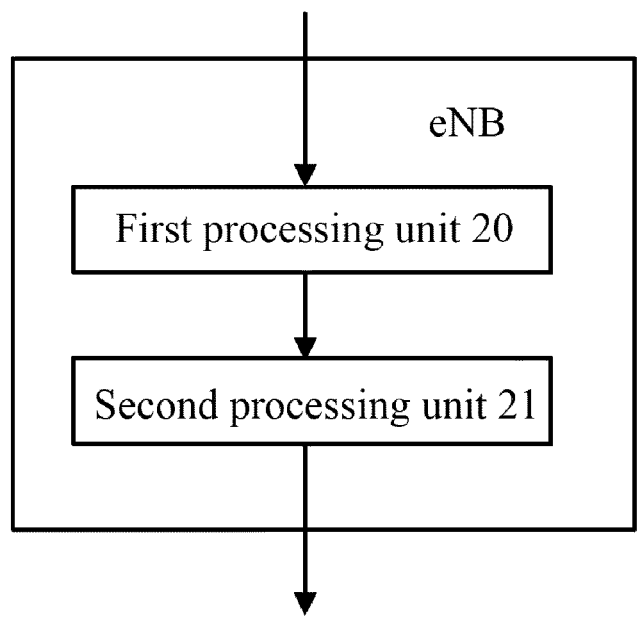
FIG. 5 is a functionally structural diagram of an eNB in an embodiment of the invention.

Referring to FIG. 5, when the foregoing apparatus for instructing an MDT log result to be obtained is an eNB, the eNB includes a first processing unit 20 and a second processing unit 21, where:

The first processing unit 20 is configured to determine that a UE accesses a target cell from a source cell and that the UE stores an unreported MDT log result; and The second processing unit 21 is configured to transmit a log availability indication to the target cell to instruct a serving equipment of the target cell to obtain the MDT log result from the UE.

Under the foregoing principle, in an embodiment of the invention taking an LTE system as an example, when it is determined that a UE accesses a target cell from a source cell and that the UE stores an unreported MDT log result (which can be an MDT log result which has not been reported at all or a partially unreported MDT log result), a log availability indication is sent to the target cell to instruct a serving equipment of the target cell to obtain the MDT log result from the UE, where the access to the target cell from the source cell is determined by: determining that the UE is handover to the target cell from the source cell (that is, a cell handover takes place) or determining that the connection between the UE and the source cell has been broken and the UE selects the target cell to reestablish a connection (that is, cell reestablishment takes place).

The foregoing operation flow can be performed by the UE itself or by the eNB of the source cell of the UE prior to the re-access and will be introduced below respectively in several embodiments.

Figure 6:
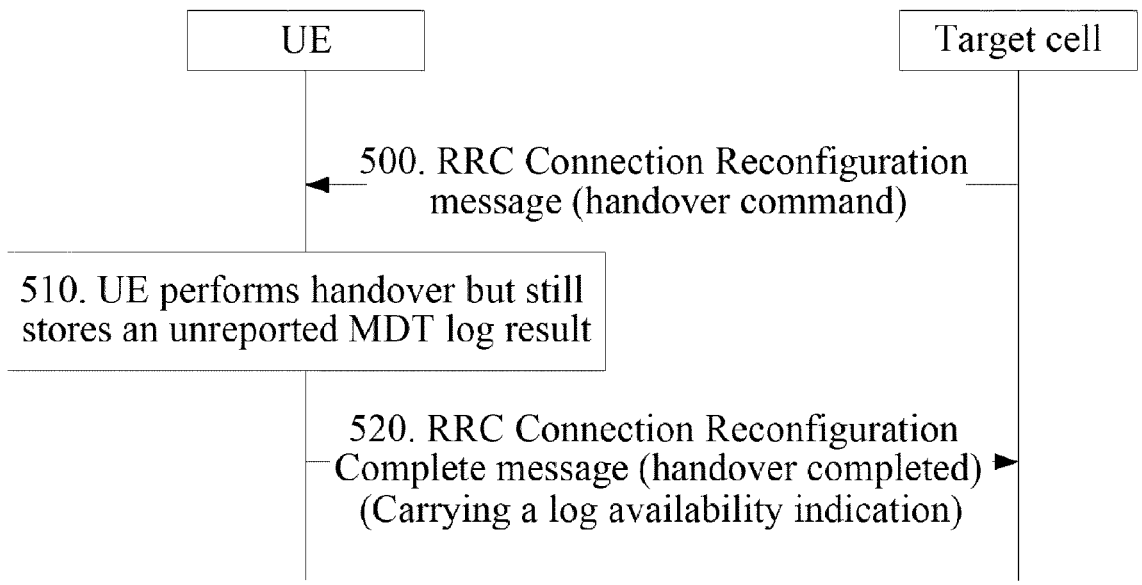
FIG. 6 is a flow chart of a UE transmitting a log availability indication in a handover process in an embodiment of the invention.

Referring to FIG. 6, in a first scenario, a UE handover to a target cell from a source cell may have transmitted a log availability indication in the source cell prior to the handover but have not reported a stored MDT log result to the network side (including two scenarios that it has not been reported at all and in which only a part thereof has been reported), and then a log availability indication can be carried in an RRC Connection Reconfiguration Complete message to instruct a serving equipment of the target cell to obtain the MDT log result if the UE still stores it when the RRC Connection Reconfiguration Complete message is transmitted upon successful handover. Specific steps are as follows:

Step 500: A target cell transmits an RRC Connection Reconfiguration message to a UE to instruct the UE to be handover to the target cell from a source cell.

Step 510: The UE performs a handover operation to be handover to the target cell from the source cell and determines that an unreported MDT log result is stored locally.

Step 520: The UE transmits an RRC Connection Reconfiguration Complete message to the target cell to notify a serving equipment of the target cell about completion of the handover and carries in a log availability indication in the RRC Connection Reconfiguration Complete message to notify the serving equipment of the target cell that the unreported MDT log result is stored locally.

Upon reception of the RRC Connection Reconfiguration Complete message transmitted from the UE, the target cell knows from the log availability indication that the UE stores locally the unreported MDT log result and then transmits a retrieval request to the UE on an appropriate occasion to instruct the UE to report the unreported MDT log result to the network side.

In the foregoing embodiment, the log availability indication may not be carried in the transmitted RRC Connection Reconfiguration Complete message after the handover if the UE has no available MDT log result to report; and scenarios in which there is no available MDT log result to report in a practical application include but will not limited to:

The UE is not configured with logged MDT measurement;

The UE is configured with logged MDT measurement and obtains an MDT log result but has reported it in the source cell prior to the handover; and The UE is configured with logged MDT measurement but has not finished measurement and has no available MDT log result.

Figure 7:
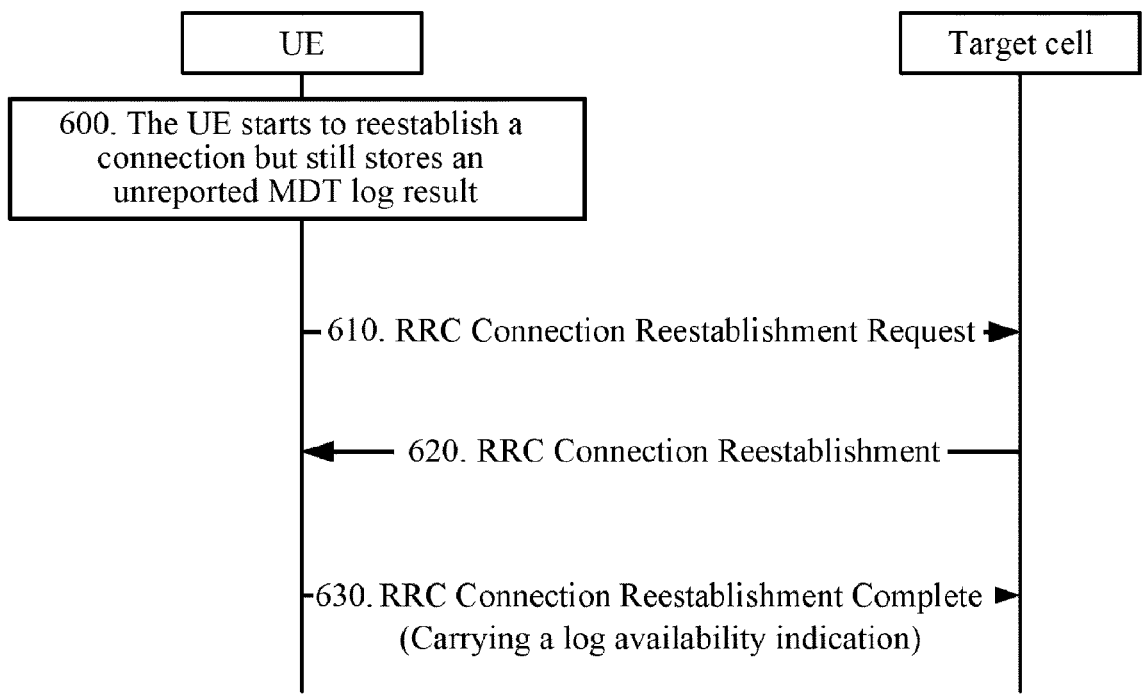
FIG. 7 is a flow chart of a UE transmitting a log availability indication in a reestablishment process in an embodiment of the invention.

Referring to FIG. 7, in a second scenario, a UE may have transmitted a log availability indication in a source cell prior to reestablishment but have not managed to report a stored available MDT log result to the network side when the connection between the UE and the source cell has been broken and the UE selects a new target cell to reestablish a connection, and then the UE can sent a log availability indication in an RRC Connection Reestablishment Complete message to instruct a serving equipment of the target cell to obtain the available MDT log result if it is determined that the available MDT log result is still stored locally when the RRC Connection Reestablishment Complete message is transmitted. Specific steps are as follows:

Step 600: A UE triggers a reestablishment flow and determines that an unreported MDT log result is stored locally.

Step 610: The UE breaks the connection with the source cell and transmits an RRC Connection Reestablishment Request message to a target cell.

Step 620: The target cell returns an RRC Connection Reestablishment message to the UE.

Step 630: The UE reestablishes a connection with the target cell and transmits an RRC Connection Reestablishment Complete message to the target cell upon completion of establishing the connection to notify a serving equipment of the target cell about completion of reestablishment and transmits a log availability indication in the RRC Connection Reestablishment Complete message to notify the serving equipment of the target cell that the unreported MDT log result is stored locally.

Upon reception of the RRC Connection Reestablishment Complete message transmitted from the UE, the target cell knows from the log availability indication that the UE stores locally the unreported MDT log result and then transmits a retrieval request to the UE on an appropriate occasion to instruct the UE to report the unreported MDT log result to the network side.

In the foregoing embodiment, the log availability indication may not be carried in the transmitted RRC Connection Reestablishment Complete message after the handover if the UE has no available MDT log result to report; and scenarios in which there is no available MDT log result to report in a practical application include but will not limited to:

The UE is not configured with logged MDT measurement;

The UE is configured with logged MDT measurement and obtains an MDT log result but has reported it in the old cell prior to reestablishment; and The UE is configured with logged MDT measurement but has not finished measurement and has no available MDT log result.

In a practical application, the UE with a broken connection with the source cell can also select the current source cell as a selected object when selecting the target cell, that is, the source cell and the target cell can be the same cell, and at this time, the UE may not transmit any log availability indication, or may still transmit a log availability indication again to the target cell, this is flexibly depends on the implementation, and a repeated description will be omitted here.

Unlike the foregoing two embodiments, the log availability indication can alternatively be transported in an inter-node message and transmitted from the source cell to the target cell in a practical application.

Figure 8:
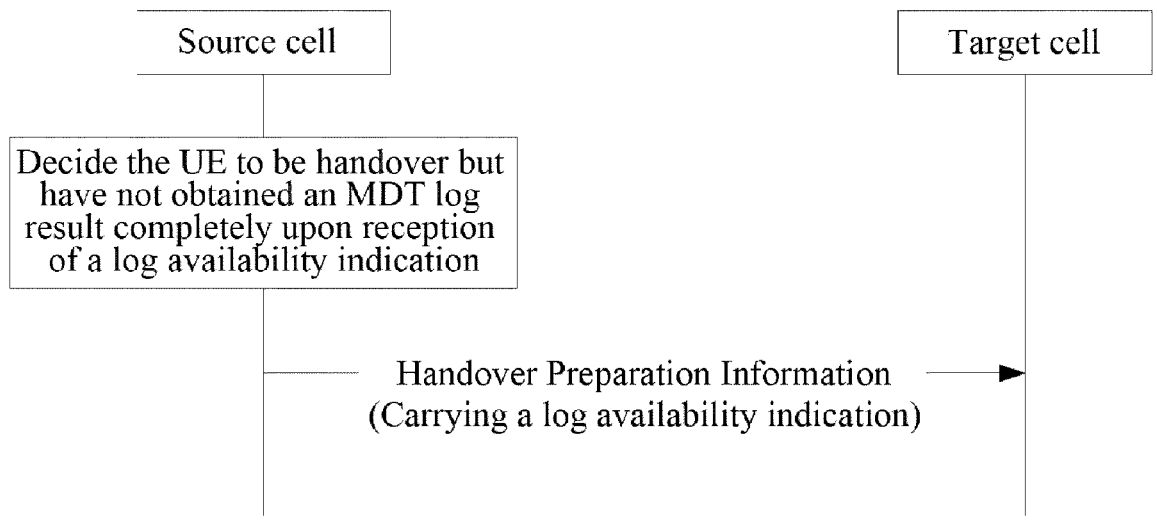
FIG. 8 is a flow chart of an eNB serving a source cell transmitting a log availability indication in a handover process in an embodiment of the invention.

Taking a handover flow as an example, an eNB serving a source cell decides a UE to be handover and transmits stored context information of the UE to a target cell by a Handover Preparation flow, and then the target cell transmits a handover command, i.e., an RRC Connection Reconfiguration message, to the UE through the source cell to instruct the UE to perform handover. A context of the UE is transported directly at the network side in the foregoing process, and in a practical application, configuration information of a logged MDT can not be transported at the network side between nodes, but a log availability indication can be transported together with the context of the UE between nodes at the network side to continue a report of an MDT log result which has not been finished in the source cell, thereby the target cell could obtain the reliable MDT log result in time. Referring to FIG. 8, in the present embodiment, an eNB serving a source cell decides a UE to be handover and then determines that the UE still stores an unreported MDT log result if a log availability indication reported from the UE in the source cell has been received and the MDT log result has not been obtained completely, and then the eNB serving the source cell carries a log availability indication together with a context of the UE (also referred to as a UE context) by a Handover Preparation flow prior to the handover to instruct a serving equipment of a target cell to obtain the unreported MDT log result of the UE on an appropriate occasion after the handover is succeed.

Figure 9:
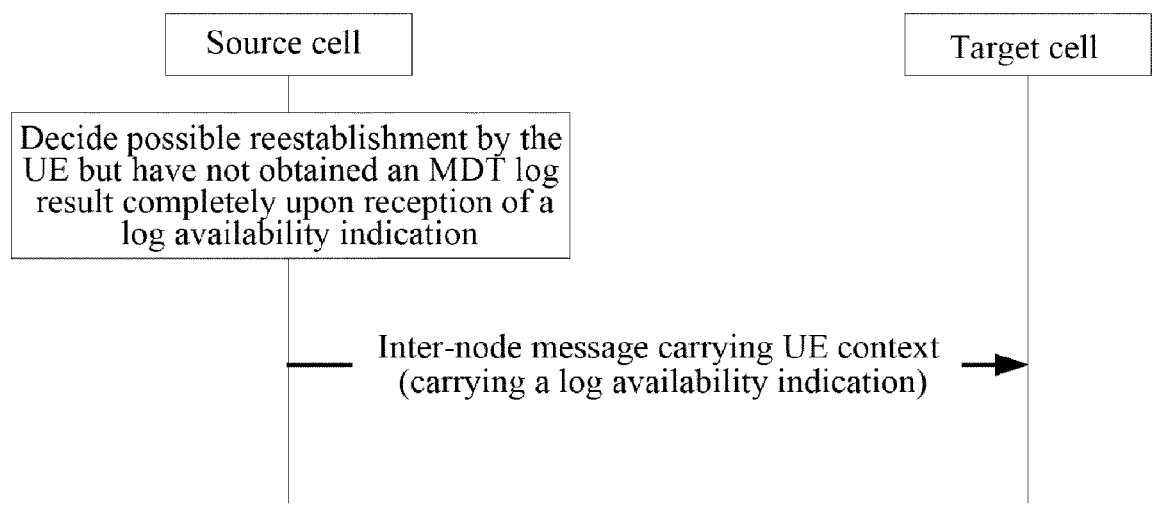
FIG. 9 is a flow chart of an eNB serving a source cell transmitting a log availability indication in a reestablishment process in an embodiment of the invention.

Taking an establishment flow as an example, an eNB serving a source cell decides a UE to be handover and transmits stored context information of the UE to a cell possibly to be reestablished by the UE, and the UE will firstly perform a cell selection process to reestablish a connection and can succeeds in reestablishment only if a selected target cell stores the context information of the UE; otherwise, reestablishment by the UE will fail and UE consequently enters the idle mode if the selected target cell does not have the context information of the UE. A context of the UE is transported directly at the network side in the foregoing process, and in a practical application, configuration information of a logged MDT can not be transported at the network side between nodes, but a log availability indication can be transported together with the context of the UE between nodes at the network side to continue a report of an MDT log result which has not been finished in the source cell, thereby the target cell could obtain the reliable MDT log result in time. Referring to FIG. 9, in the present embodiment, an eNB serving a source cell decides a UE to perform reestablishment and then determines that the UE still stores an unreported MDT log result if a log availability indication reported from the UE in the source cell has been received and the MDT log result has not been obtained completely, and then the eNB serving the source cell carries a log availability indication together with a UE context in an inter-node message prior to a possibly occurring reestablishment flow to instruct a possible target cell to obtain the unreported MDT log result of the UE on an appropriate occasion after establishment is performed.

In the foregoing two embodiments, the log availability indication may not be carried in the message transmitted from the target cell if the eNB serving the source cell determines that the UE has no unreported MDT log result prior to the handover of or reestablishment by the UE when the eNB transmits the context of the UE. Scenarios in which no log availability indication is reported in a practical application include but will not be limited to the following several ones:

The network side does not configure the UE with logged MDT measurement;

The network side configures the UE with logged MDT measurement but has obtained a report of an MDT log result when a message is transmitted between nodes of the network; and The UE is configured at the network side with logged MDT measurement but has not finished measurement and has no reportable MDT log result.

In the foregoing respective embodiments, the UE can transmit the log availability indication to the target cell via an air interface after the handover or reestablishment so that the UE can report the MDT log result upon reception of information indicating that the target cell supports an MDT report or can report an MDT log result even if the information indicating whether an MDT report is supported at the network side is not received.

On the other hand, the log availability indication can be transmitted from the network side of source cell to the network side of target cell in an inter-node message prior to the handover or reestablishment, so that the UE can continue a report of the MDT log result in the target cell after the handover or reestablishment.

In this way the target cell can obtain the log availability indication of the UE in time and thus initiate a request to the UE to retrieve the MDT log result on an appropriate occasion and obtain the MDT log result reported from the UE in time, and further collect network environment information and obtain the accurate environment information.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for reporting a Minimization Drive Test, MDT, log result, comprising:
   determining that a User Equipment, UE, accesses a target cell from a source cell and that the UE stores an unreported MDT log result; and transmitting a message carrying a log availability indication to the target cell to instruct a serving equipment of the target cell to obtain the MDT log result from the UE;

wherein determining that the UE accesses the target cell from the source cell and that the UE stores the unreported MDT log result comprises: the UE determining that the UE is handover to the target cell from the source cell and that the UE stores the unreported MDT log result; and the transmitting the message carrying the log availability indication to the target cell comprises: the UE carrying the log availability indication in a Radio Resource Control, RRC, Connection Reconfiguration Complete message and transmitting the RRC Connection Reconfiguration Complete message to the target cell.

2. A method for reporting a Minimization Drive Test, MDT, log result, comprising:

determining that a User Equipment, UE, accesses a target cell from a source cell and that the UE stores an unreported MDT log result; and transmitting a message carrying a log availability indication to the target cell to instruct a serving equipment of the target cell to obtain the MDT log result from the UE;

wherein determining that the UE accesses the target cell from the source cell and that the UE stores the unreported MDT log result comprises:

the UE determining that a connection between the UE and the source cell has been broken, that the UE selects the target cell to reestablish a connection and that the UE stores the unreported MDT log result; and the transmitting the message carrying the log availability indication to the target cell comprises:

the UE carrying the log availability indication in a Radio Resource Control, RRC, Connection Reestablishment Complete message and transmitting the RRC Connection Reestablishment Complete message to the target cell.

3. An apparatus for reporting a Minimization Drive Test, MDT, log result, comprising:

a first processing unit configured to determine that a User Equipment, UE, accesses a target cell from a source cell and that the UE stores an unreported MDT log result; and a second processing unit configured to transmit a message carrying a log availability indication to the target cell to instruct a serving equipment of the target cell to obtain the MDT log result from the UE;

wherein the first processing unit determining that the UE accesses the target cell from the source cell comprises: determining that the UE is handover to the target cell from the source cell or determining that a connection between the UE and the source cell has been broken and that the UE selects the target cell to reestablish a connection.

4. The apparatus according to claim 3, wherein the apparatus is a UE; and the second processing unit carries the log availability indication in a Radio Resource Control, RRC, Connection Reconfiguration Complete message and transmits the RRC Connection Reconfiguration Complete message to the target cell when the first processing unit determines that the apparatus itself is handover to the target cell from the source cell and that the apparatus itself stores the unreported MDT log result.

5. The apparatus according to claim 3, wherein the apparatus is a UE; and the second processing unit carries the log availability indication in a Radio Resource Control, RRC, Connection Reestablishment Complete message and transmits the RRC Connection Reestablishment Complete message to the target cell when the first processing unit determines that a connection between the apparatus itself and the source cell has been broken, that the apparatus itself selects the target cell to reestablish a connection and that the apparatus itself stores locally the unreported MDT log result.

6. The apparatus according to claim 3, wherein the apparatus is a network-side equipment which serves the source cell; and the second processing unit carries the log availability indication in a Handover Preparation message and transmits the Handover Preparation message to the target cell when the first processing unit determines that the UE is handover to the target cell from the source cell and that the UE stores the unreported MDT log result.

7. The apparatus according to claim 3, wherein the apparatus is a network-side equipment which serves the source cell; and the second processing unit carries the log availability indication in a message, comprising a UE context, transmitted to the target cell and transmits the message comprising the UE context to the target cell when the first processing unit determines that a connection between the UE and the source cell has been broken, that the UE selects the target cell to reestablish a connection and that the UE stores the unreported MDT log result.

* * * * *